(12) United States Patent
Hsu (10) Patent No.: US 8,988,053 B2
(45) Date of Patent: Mar. 24, 2015

(54) MULTIPHASE DC-TO-DC CONVERTER (75) Inventor: Ta-Ching Hsu, Taipei (TW)

(73) Assignee: Niko Semiconductor Co., Ltd., New Taipei (TW)

( * ) Notice: Subject to any disclaimer, the term of this patent is extended or adjusted under 35 U.S.C. 154(b) by 303 days.

(21) Appl. No.: 13/607,803

(22) Filed: Sep. 10, 2012

(65) Prior Publication Data
US 2014/0002038 A1    Jan. 2, 2014

(30) Foreign Application Priority Data
Jun. 28, 2012 (TW) .............................. 101123295 A (51) Int. Cl.
H02M 3/158 (2006.01)
H02M 1/00 (2006.01)

(52) U.S. Cl.
CPC .... H02M 3/1584 (2013.01); H02M 2003/1586 (2013.01); H02M 2001/0009 (2013.01)
USPC ....................................................... 323/272

(58) Field of Classification Search
USPC ....................... 323/246, 272, 282, 285–287
See application file for complete search history.

(56) References Cited

U.S. PATENT DOCUMENTS

| 6,424,129 B1* | 7/2002 | Lethellier | 323/272 |
| 7,233,132 B1* | 6/2007 | Dong et al. | 323/272 |
| 8,330,438 B2* | 12/2012 | Sreenivas | 323/272 |
| 2004/0227495 A1* | 11/2004 | Egan et al. | 323/272 |
| 2006/0238179 A1* | 10/2006 | Harris et al. | 323/272 |
| 2008/0203985 A1* | 8/2008 | Dong et al. | 323/272 |
| 2011/0115447 A1* | 5/2011 | Lin et al. | 323/234 |
| 2014/0191738 A1* | 7/2014 | Xiao et al. | 323/272 |

* cited by examiner

Primary Examiner — Fred E Finch, III
(74) Attorney, Agent, or Firm — CKC & Partners Co., Ltd.

(57) ABSTRACT

A multiphase DC-to-DC converter is disclosed herein, which includes at least one DC-to-DC converting module. Each DC-to-DC converting module at least includes a first output inductor, a second output inductor and a current detector. The current detector is configured for detecting currents pass through the first output inductor and second output inductor. The current detector includes a first resistance, a second resistance, a first capacitor, a second capacitor, and a third resistance. The third resistance is directly or indirectly coupled between the first capacitor and a load circuit, and directly or indirectly coupled between the second capacitor and the load circuit, such that when the first capacitor is charged, a portion of the current charging the first capacitor passes through the second capacitor.

16 Claims, 6 Drawing Sheets

MULTIPHASE DC-TO-DC CONVERTER

RELATED APPLICATIONS

This application claims priority to Taiwan Application Serial Number 101123295, filed Jun. 28, 2012, which is herein incorporated by reference.

BACKGROUND

1. Field of Invention

The present invention relates to DC-to-DC converting device. More particularly, the present invention relates to multiphase DC-to-DC converter.

2. Description of Related Art

With advances in technology, various kind of electrical devices are commonly used in human life. Different electrical devices or different electrical circuits in an electrical device normally involve different applications of DC voltages. Therefore, a steady and reliable DC-to-DC converting device has been becoming more and more important.

Generally, the upper limit of the output current for a single-phase power converting device is about 30 Amperes (A). If the output current exceeds the upper limit, the performance would be fast deteriorated. Hence, in a device configured with a high driving current, such as a computer or a car, multiphase DC-to-DC converting devices are needed. However, the conventional multiphase DC-to-DC converting device has problems that the output currents of each phases are usually uneven, and when the output current is overly biased, the multiphase DC-to-DC converting device may therefore have a inferior performance becoming unsteady. As such, the components therein may face potential damages by overheating.

Hence, a multiphase DC-to-DC converting device with even output currents of each phase is required.

SUMMARY

One aspect of the invention is a multiphase DC-to-DC converter, in which the output currents of the phases are even.

In accordance with one embodiment, the multiphase DC-to-DC converter includes a pulse width modulation module, a current feedback module, and at least one DC-to-DC converting module. The pulse width modulation module is configured for generating a plurality of sets of control pulses. The DC-to-DC converting module includes a first output inductor, a second output inductor, a first switch element, a second switch element, and a current detector. The first switch element is coupled to the first output inductor, wherein the first switch element receives a set of the control pulses to control a current passing through the first output inductor. The second switch element is coupled to the second output inductor, wherein the second switch element receives another set of the control pulses to control a current passing through the second output inductor. The current detector is coupled in parallel to the first output inductor and the second output inductor, for detecting the current passing through the first output inductor and the current passing through the second output inductor, wherein the current feedback module adjusts duty cycles of each set of the control pulses in real time according to the currents detected by the current detector. The current detector includes a first resistor, a second resistor, a first capacitor, a second capacitor, and a third resistor, wherein the first resistor is coupled in series to the first capacitor, the second resistor is coupled in series to the second capacitor, the third resistor is directly or indirectly coupled between the first capacitor and a load circuit, and the third resistor is directly or indirectly coupled between the second capacitor and the load circuit, such that when the first capacitor is charged, a portion of a charging current for charging the first capacitor passes through the second capacitor, and when the second capacitor is charged, a portion of a charging current for charging the second capacitor passes through the first capacitor.

In accordance with one embodiment, the first end of the first resistor, the first end of the first output inductor, and the first switch element are coupled. The second end of the first resistor is coupled to the first end of the first capacitor. The second end of the first capacitor is coupled to the first end of the third resistor. The second end of the third resistor, the second end of the first output inductor, the second end of the second output inductor and the load circuit are coupled.

In accordance with one embodiment, the first end of the second resistor, the first end of the second output inductor, and the second switch element are coupled. The second end of the second resistor is coupled to the first end of the second capacitor. The second end of the second capacitor is coupled to the first end of the third resistor. The second end of the third resistor, the second end of the first output inductor, the second end of the second output inductor and the load circuit are coupled.

In accordance with one embodiment, the set of control pulses controlling the first switch element and the set of control pulses controlling the second switch element are in anti-phase.

In accordance with one embodiment, when the first capacitor is charged, the second capacitor is discharged, and when the second capacitor is charged, the first capacitor is discharged.

In accordance with one embodiment, a resistance of the third resistor is smaller than or equal to a resistance of the first resistor, and the resistance of the third resistor is smaller than or equal to the resistance of the second resistor.

In accordance with one embodiment, the first switch element includes a first high side switch, and the second switch element includes a second high side switch.

In accordance with one embodiment, the first switch element further includes a first low side switch. The first low side switch is coupled to the first high side switch. The second switch element includes a second low side switch. The second low side switch is coupled to the second high side switch.

In accordance with one embodiment, the resistance of the third resistor is configured to adjust a time difference between a time point that one of the currents passing through the first and second output inductors is detected as becoming zero by the current detector and a time point that the corresponding current passing through the first or second output inductor exactly becomes zero.

In accordance with one embodiment, the multiphase DC-to-DC converter further includes voltage feedback module and a voltage dividing module. The voltage dividing module is configured for dividing an output voltage which is provided from the DC-to-DC converter to the load circuit. The voltage dividing module includes a first voltage dividing resistor and a second voltage dividing resistor, in which the first voltage dividing resistor and the second voltage dividing resistor are coupled in series, and the voltage feedback module adjusts the duty cycles of each set of control pulses according to the voltage across the second voltage dividing resistor.

With the embodiments abovementioned, the multiphase DC-to-DC converter with even output currents of each phase can be realized, in which the currents passing through the first and second output inductors can be reflected on the voltages across the capacitors in the current detector, such that the pulse width modulation module can adjust the duty cycles of the control pulses in real time to prevent the currents passing through the output inductors from being uneven. In addition, the third resistor can be further used to adjust the time difference between the time point that the currents passing through the first and second output inductors is detected as decreasing to zero by the current detector and the time point that the currents passing through the first and second output inductors exactly decreases to zero, so as to process a more specific and subtle tuning of the multiphase DC-to-DC converter.

BRIEF DESCRIPTION OF THE DRAWINGS

The invention can be more fully understood by reading the following detailed description of the embodiment, with reference made to the accompanying drawings as follows.

DETAILED DESCRIPTION

In the following detailed description, for purposes of explanation, numerous specific details are set forth in order to attain a thorough understanding of the disclosed embodiments. It will be apparent, however, that one or lore embodiments may be practiced without these specific details. In other instances, well-known structures and devices are schematically shown in order to simplify the drawing.

One aspect of the invention is a multiphase DC-to-DC converter, in which the output currents of each phases are even.

Figure 1:
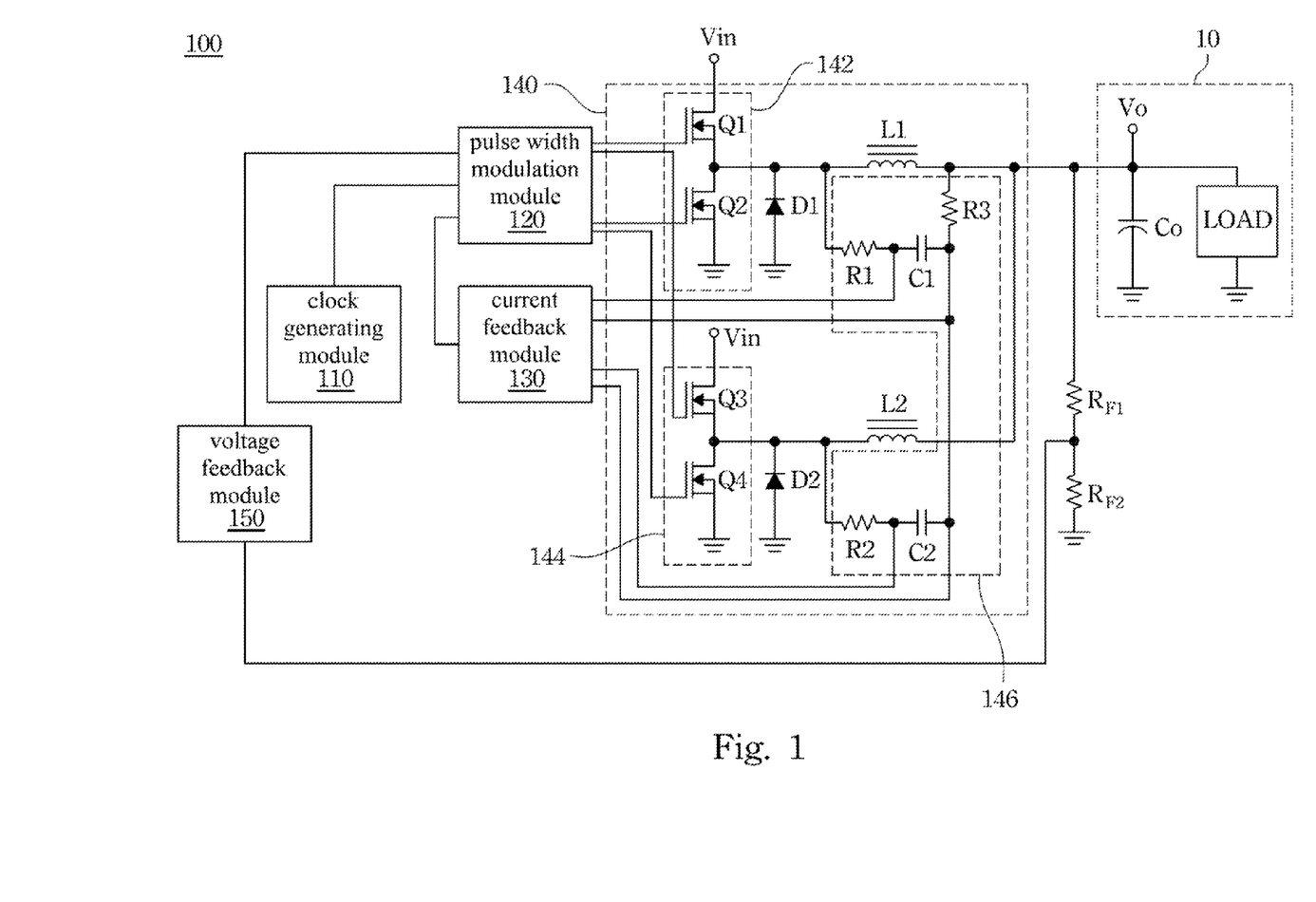
FIG. 1 is a circuit diagram illustrating a multiphase DC-to-DC converter according to one embodiment of the invention, in which some elements of the multiphase DC-to-DC converter are shown in block diagram form therewithin.

FIG. 1 is a circuit diagram illustrating a multiphase DC-to-DC converter 100 according to one embodiment of the invention, in which some elements of the multiphase DC-to-DC converter 100 are shown in block diagram form therewithin. The multiphase DC-to-DC converter 100 includes a clock generating module 110, a pulse width modulation module 120, a current feedback module 130, and at least one DC-to-DC converting module 140. In this embodiment, each module abovementioned can be implemented by hardware. In addition, the multiphase DC-to-DC converter 100 in this embodiment has just one DC-to-DC converting module 140, and the number of the phases is two. However, in other embodiments, the multiphase DC-to-DC converter 100 can have two, three or more DC-to-DC converting modules 140 and the number of phases can accordingly be four, six or more. The clock generating module 110 is configured to generate a driving clock to drive the pulse width modulation module 120. The pulse width modulation module 120 is configured to generate a plurality of sets of control pulses in accordance with the driving clock. The duty cycles of each set of control pulses can determine an output voltage $V_O$ of the multiphase DC-to-DC converter 100. The current feedback module 130 is configured to receive a feedback signal from the DC-to-DC converting module 140, and make the pulse width modulation module 120 adjusting the duty cycles of control pulses, when an output current of a phase of the DC-to-DC converting module 140 is too big or too small.

The DC-to-DC converting module 140 may include a first output inductor L1 a second output inductor L2, a first switch element 142, a second switch element 144, a diode D1 a diode D2, and a current detector 146.

In structure, the first switch element 142 is coupled to an input power supply $V_{IN}$, the pulse width modulation module 120, and the first output inductor L1. The second switch element 144 is coupled to the input power supply $V_{IN}$, the pulse width modulation module 120, and the second output inductor L2. The first output inductor L1 is coupled to the diode D1 and a load circuit 10. The second output inductor L2 is coupled to the diode D2 and the load circuit 10. The current detector 146 is coupled in parallel to the first output inductor L1 and the second output inductor L2, and coupled to the current feedback module 130.

In operation, the pulse width modulation module 120 can separately provide different sets of control pulses to the first switch element 142 and the second switch element 144, in which the sets of control pluses can be in anti-phase. When the first switch element 142 is in a first operating state, the input power supply $V_{IN}$ is coupled to the first output inductor L1, and a current flowing from the input power supply $V_{IN}$ passes through the first switch element 142 and first output inductor L1 to the load circuit 10 and charges an output capacitor $C_O$ of the load circuit 10. In this time, the first output inductor L1 stores energy because of the current passing through. When the first switch element 142 is in a second operating state, the input power supply $V_{IN}$ and the first output inductor L1 are disconnected. In this time, one end of the first output inductor L1 releases the energy stored previously with a current to the load circuit 10, and the current returns to another end of the first output inductor L1 via the diode D1. The operation of the second switch element 144 is similar to the first switch element 142, and the operation of the first and second switch elements 142, 144 can be in anti-phase. In such a manner, the currents $I_{L1}$, $I_{L2}$ respectively passing through the first and second output inductors L1 L2 can charge the output capacitor $C_O$ of the load circuit 10 in turn, such that the output capacitor $C_O$ can provide a steady output voltage $V_O$, and the DC-to-DC converting operation can be therefore achieved. In addition, the current detector 146 detects the currents $I_{L1}$, $I_{L2}$ passing through the first and second output inductors L1, L2, and the current feedback module 130 adjusts duty cycles of each set of the control pulses in real time according to the currents $I_{L1}$, $I_{L2}$ detected by the current detector 146, so as to prevent components in the circuit being damaged as a result of current overload. It is noted that, in this embodiment, the sets of control pulses provided to the first and second switch elements 142, 144 can be in anti-phase for the purpose of making the currents $I_{L1}$, $I_{L2}$ charging the output capacitor $C_O$ evenly over time, but a person skilled in the art can design the phase difference between the sets of control pulses provided to the first and second switch elements 142, 144 on the basis of actual requirement, and the phase difference is not limited to the embodiment abovementioned.

In this embodiment, the first switch element 142 may include a first high side switch Q1 and a first low side switch 02 which are coupled in series. The second switch element 142 may include a second high side switch Q3 and a second low side switch. Q4 which are coupled in series. The switches Q1 Q2, Q3, and Q4 are turned on or off by the control pulses. The first low side switch Q2 and the diode D1 are coupled in parallel, and the second low side switch Q4 and the diode D2 are coupled in parallel. When one of the first and second switch elements 142, 144 is in the second operating state, the corresponding low side switch Q2/Q4 can be turned on and replace the corresponding diode D1/D2 to form a current path with a lower forward bias. A person skilled in the art can clearly understand that, the first and second low side switches Q2, Q4 may include body diodes, and the diodes D1, D2 can therefore be removed in some embodiment. However, the power loss of the body diode is often larger than the power loss of a common diode under forward bias, and hence, in this embodiment, the first and second low side switches Q2, Q4 are still coupled with diodes D1, D2 in parallel.

The current detector 146 may be a circuit including a first resistor R1 a second resistor R2, a first capacitor Q1, a second capacitor C2, and a third resistor R3. The first end of the first resistor R1, the first end of the first output inductor L1 are coupled to the node between the first high side switch Q1 and the first low side switch Q2. The second end of the first resistor R1 is coupled to the first end of the first capacitor C1. The second end of the first capacitor C1 is coupled to the first end of the third resistor R3. The first end of the second resistor R2, the first end of the second output inductor L2 are coupled to the node between the second high side switch Q3 and the second low side switch Q4. The second end of the second resistor R2 is coupled to the first end of the second capacitor C2. The second end of the second capacitor C2 is coupled to the first end of the third resistor R3. The second end of the third resistor R3, the second end of the first output inductor L1, the second end of the second output inductor L2 and the load circuit 10 are coupled. A person skilled in the art can clearly understand that, the position of the first capacitor C1 and the position of the first resistor R1 can be interchanged, and the position of the second capacitor C2 and the position of the second resistor R2 can be interchanged, and these interchanges would not virtually alter the characteristic of the circuit. In other word, the third resistor R3 may be directly or indirectly coupled between the first capacitor C1 and the load circuit 10, and directly or indirectly coupled between the second capacitor C2 and the load circuit 10.

Figure 2:
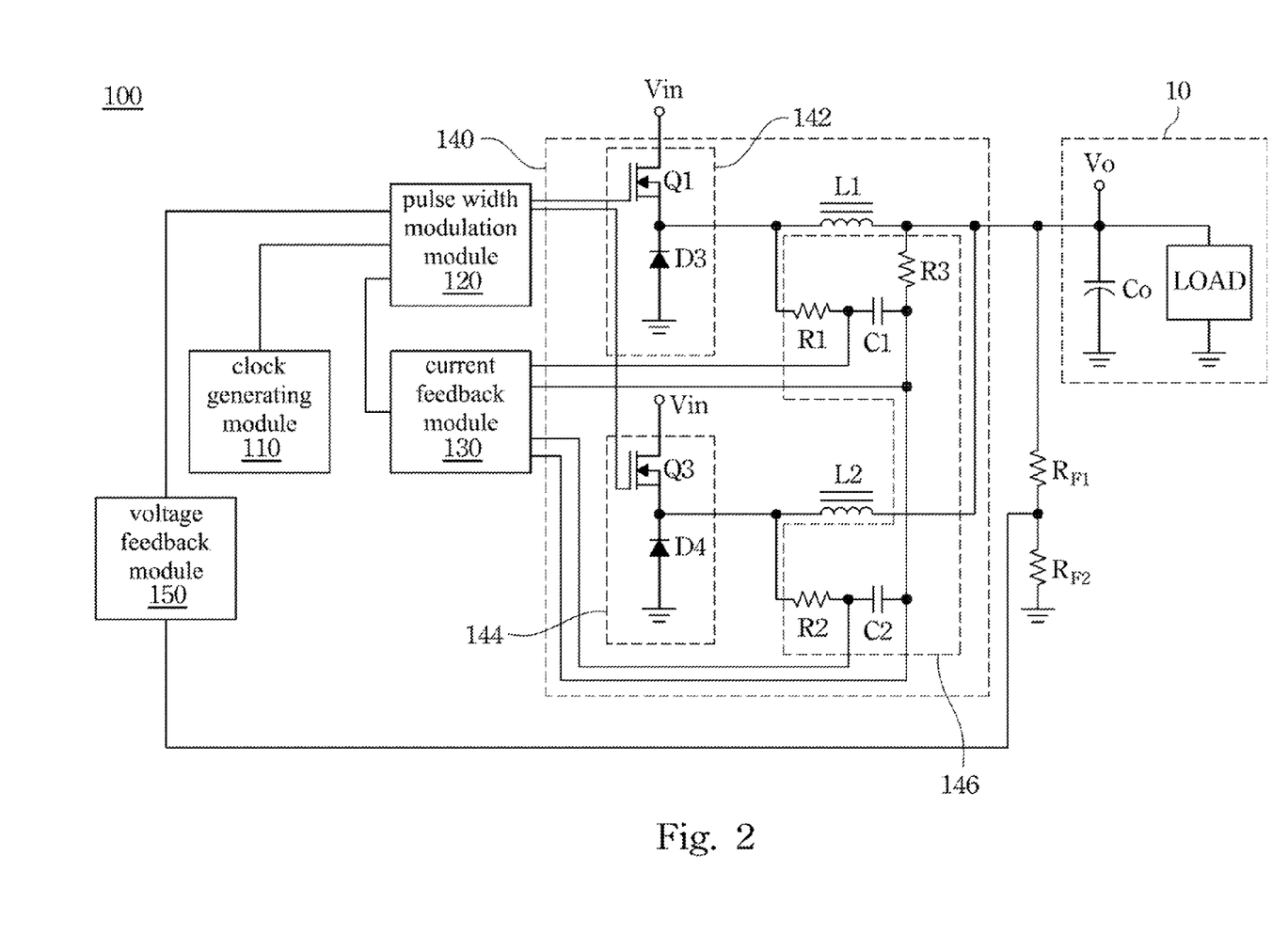
FIG. 2 is a circuit diagram illustrating the multiphase DC-to-DC converter according to one embodiment of the invention, in which some elements of the multiphase DC-to-DC converter are shown i block diagram form therewithin.

FIG. 2 is a circuit diagram illustrating the multiphase DC-to-DC converter 100 according to one embodiment of the invention, in which some elements of the multiphase DC-to-DC converter 100 are shown in block diagram form therewithin. This embodiment is substantially similar to the embodiment in FIG. 1, and a description of aspects of the multiphase DC-to-DC converter 100 identical to those of the multiphase DC-to-DC converter 100 described with reference to FIG. 1 will not be repeated herein. In this embodiment, the first and second low side switches Q2, Q4 in FIG. 1 can be replaced by the diodes D3, D4, and as a result, the complexity in design of the pulse width modulation module 120 can be decreased due to the omission of the control pulses for turning on/off the first and second low side switches Q2, Q4.

In addition, for some embodiments, the multiphase DC-to-DC converter 100 may further include a voltage feedback module 150 and a voltage dividing module $R_{F1}$, $R_{F2}$. The voltage dividing module $R_{F1}$, $R_{F2}$ are configured to divide the output voltage $V_O$ provided from the DC-to-DC converter 140 to the load circuit 10. The voltage dividing module $R_{F1}$, $R_{F2}$ includes a first voltage dividing resistor $R_{F1}$ and a second voltage dividing resistor $R_{F2}$, and the first voltage dividing resistor $R_{F1}$ and the second voltage dividing resistor $R_{F2}$ are coupled in series. The voltage feedback module 150 can adjust the duty cycles of each set of control pulses according to the voltage across the second voltage dividing resistor R2. In such a configuration, the voltage feedback module 150 can adjust the duty cycles of each set of control pulses relative to the current of each phase and the output voltage, so as to avoid components in the circuit being damaged as a result of current overload.

Figure 3:
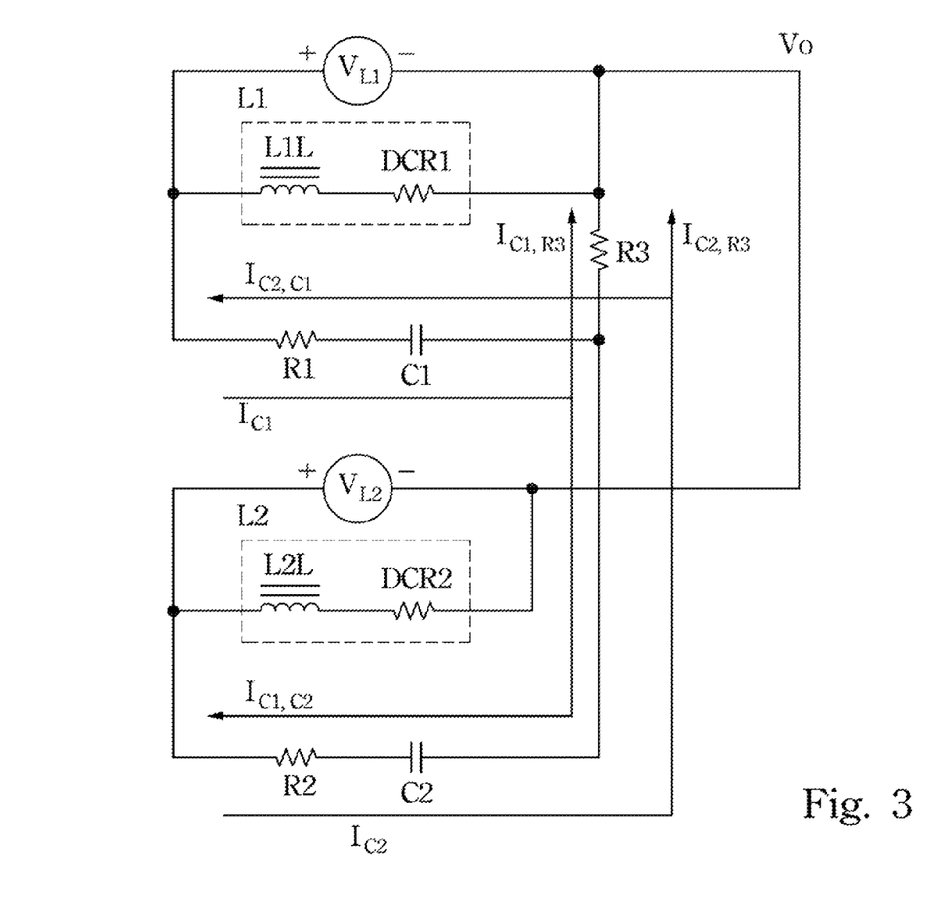
FIG. 3 is an equivalent circuit diagram illustrating a current detector in FIG. 1.

For purposes of providing a more specific description, reference will now be made to FIG. 3, which is an equivalent circuit diagram illustrating the current detector 146 in FIG. 1 In which, $V_{L1}$, $V_{L2}$ are voltages across the first and second output inductors L1, L2 respectively. The first and second output inductors L1, L2 have not only inductances of themselves L1L, L2L, but also wound resistances DCR1, DCR2 respectively. Therefore, if the product of a resistance of the first resistor R1, a capacitance of the first capacitor C1, and a value of the resistance DCR1 is design to be equal to the inductance of the first output inductor L1, then the voltage $V_{C1}$ across the first capacitor C1 would be substantially in direct proportion to the current $I_{L1}$ passing through the first output inductor L1. Similarly, if the product of a resistance of the second resistor R2, a capacitance of the second capacitor C2, and a value of the resistance DCR2 is design to be equal to the inductance of the second output inductor L2, then the voltage $V_{C2}$ across the second capacitor C2 would be substantially in direct proportion to the current passing through the second output inductor L2.

In addition, the third resistance R3 is disposed between the first capacitor C1 and the load circuit 10 for separating the first capacitor C1 and the load circuit 10, and disposed between the second capacitor C2 and the load circuit 10 for separating the second capacitor C2 and the load circuit 10. As a result, when the voltage $V_{L1}$ is at a high voltage level and the voltage $V_{L2}$ is at a low voltage level (which is lower than the high voltage level), so that the first capacitor C1 is charged and the second capacitor C2 is discharged, a portion of a current $I_{C1}$, in which the current $I_{C1}$ charges the first capacitor C1, flows forward the second capacitor C2 and the second resistor R2, as a current $I_{C1,C2}$ shown in FIG. 3, and the rest portion of the current $I_{C1}$ flows forward the third resistor R3, as a current $I_{C1,R3}$ shown in FIG. 3. On the other hand, when the voltage $V_{L1}$ is at a low voltage level and the voltage $V_{L2}$ is at a high voltage level (which is higher than the low voltage level), such that the first capacitor C1 is discharged and the second capacitor C2 is charged, a portion of a current $I_{C2}$, in which the current $I_{C2}$ charges the second capacitor C2, flows forward the first capacitor C1 and the first resistor R1, as a current $I_{C2,C1}$ shown in FIG. 3, and the rest portion of the current $I_{C2}$ flows forward the third resistor R3, as a current $I_{C2,R3}$ shown in FIG. 3.

Moreover, if the currents $I_{L1}$, $I_{L2}$ passing through the first and second inductors are discontinuous, the first capacitor C1 and the second capacitor C2 charge and discharge to each other, and therefore a time point that a voltage $V_{C1}$ across the first capacitor C1 becomes zero can be fallen behind a time point that the current $I_{L1}$ becomes zero, and similarly, a time point that a voltage $V_{C2}$ across the second capacitor C2 becomes zero can be fallen behind a time point that the current $I_{L2}$ becomes zero. While the resistance of the third resistor R3 becomes larger, the lagging time between the voltages $V_{C1}$, $V_{C2}$ becoming zero and the currents $I_{L1}$, $I_{L2}$ becoming zero will accordingly be longer. Therefore, the third resistor R3 can be used to adjust the time difference between the time point that one of the currents $I_{L1}$, $I_{L2}$ passing through the first and second output inductors L1, L2 is detected as becoming zero by the current detector 146 (i.e., one of the voltages $V_{C1}$, $V_{C2}$ becoming zero) and the time point that the corresponding current $I_{L1}/I_{L2}$ passing through the first or second output inductor L1/L2 exactly becomes zero.

Figure 4:
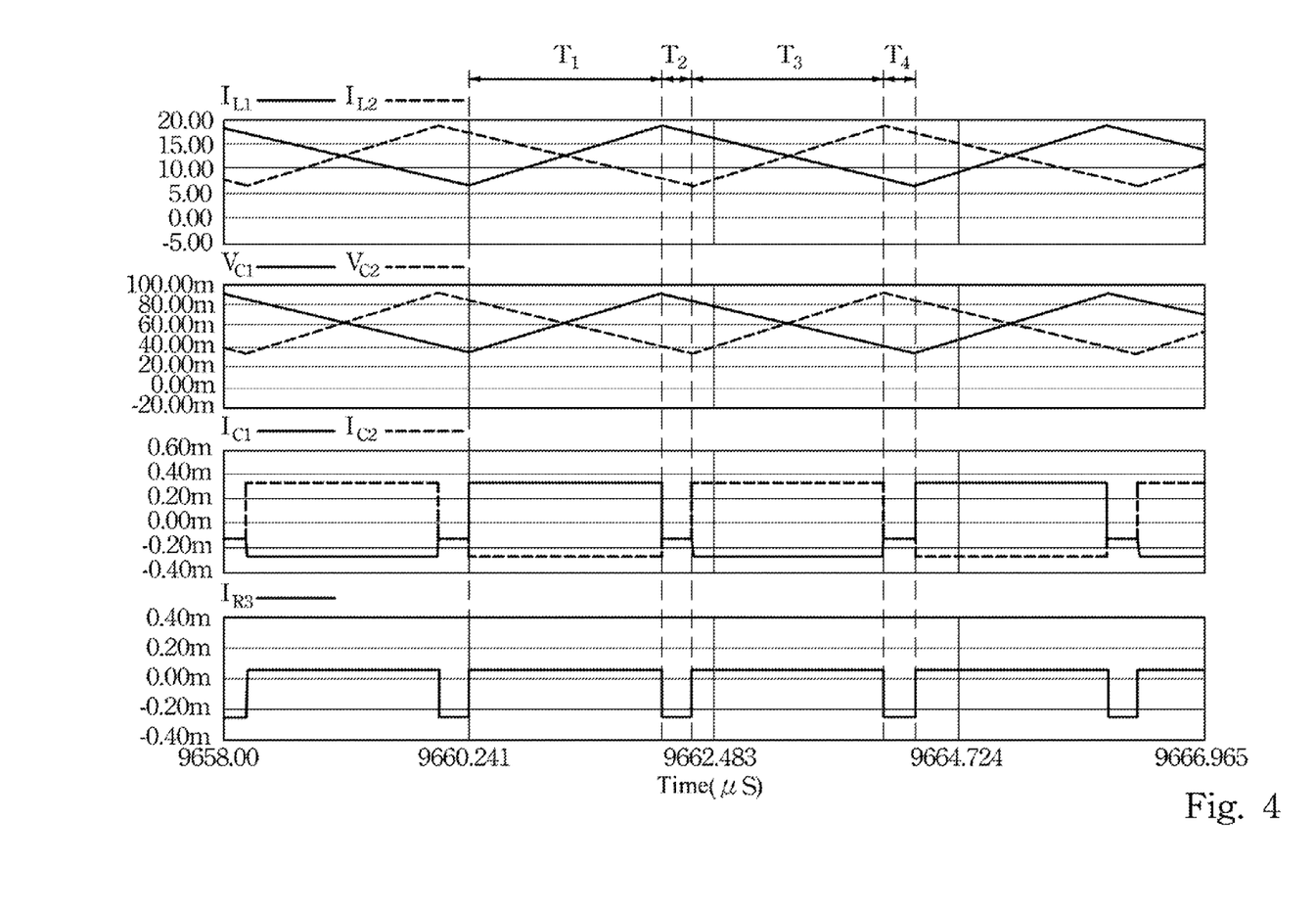
FIG. 4 is a simulation diagram separately illustrating currents passing through a first output inductor, a second output inductor, a first capacitor, a second capacitor, and a third resistor, and voltages across the first capacitor and the second capacitor in FIG. 1.

FIG. 4 is a simulation diagram separately illustrating currents $I_{L1}$, $I_{L2}$, $I_{C1}$, $I_{C2}$, $I_{R3}$ passing through the first output inductor L1, the second output inductor L2, the first capacitor C1, the second capacitor C2, and the third resistor R3, and voltages $V_{C1}$, $V_{C2}$ across the first capacitor C1 and the second capacitor C2 in FIG. 1. As shown in FIG. 4, the voltages $V_{C1}$, $V_{C2}$ across the first and second capacitors C1, C2 are substantially in direct proportion to the currents $I_{L1}$, $I_{L2}$ passing through the first and second output inductors L1, L2. In period T1, the input power supply $V_{IN}$ is connected to the first output inductor L1, and the first capacitor C1 is charged, and the current $I_{C1}$ passing through the first capacitor C1 and the current $I_{R3}$ passing through the third resistor R3 is positive (i.e., in a first direction), and the current $I_{C2}$, passing through the second capacitor C2 is negative (i.e., in a second direction opposite to the first direction). In period T2, the input power supply $V_{IN}$ is disconnected from the first output inductor L1, and the first capacitor C1 is discharged, and the current $I_{C1}$ passing through the first capacitor C1 and the current $I_{R3}$ passing through the third resistor R3 is negative. Similarly, in period T3, the input power supply $V_{IN}$ is coupled to the second output inductor L2, and the second capacitor C2 is charged, and the current I, through the second capacitor C2 and the current $I_{R3}$ passing through the third resistor R3 is positive (i.e., in a first direction), and the current $I_{C1}$, passing through the first capacitor C1 is negative (i.e., in a second direction opposite to the first direction). In period T4, the input power supply $V_{IN}$ is disconnected from the second output inductor L2, and the second capacitor C2 is discharged, and the current $I_{C2}$ passing through the second capacitor C2 and the current $I_{R3}$ passing through the third resistor R3 is negative.

Figure 5:
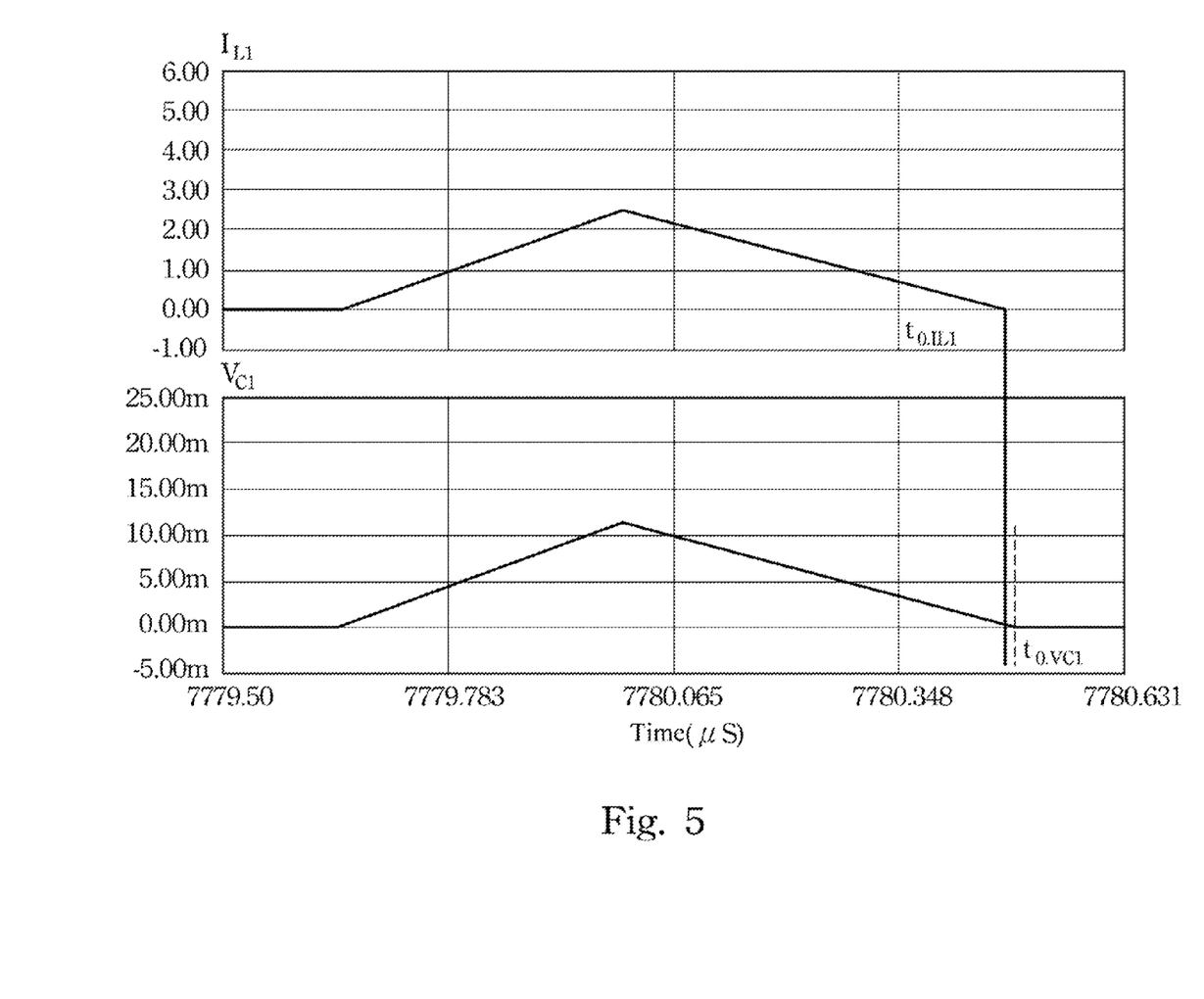
FIG. 5 is a simulation diagram separately illustrating the current passing through the first output inductor and the voltage across the first capacitor in FIG. 1 when the current passing through the first output inductor is discontinuous and when the third resistor is 2 kΩ.
Figure 6:
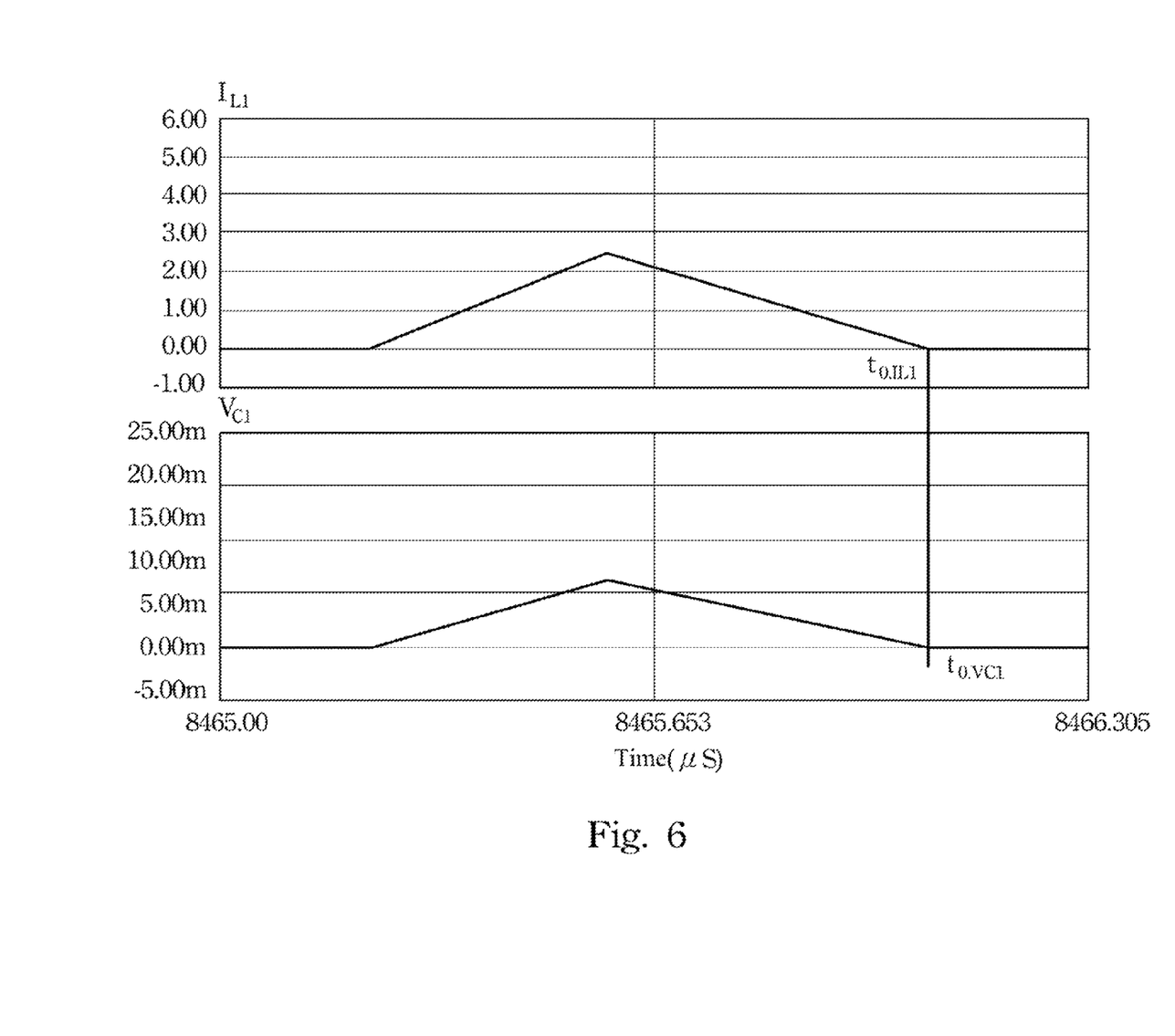
FIG. 6 is a simulation diagram separately illustrating the current passing through the first output inductor and the voltage across the first capacitor in FIG. 1 when the current passing through the first output inductor is discontinuous and when the third resistor is 0Ω.

FIG. 5 is a simulation diagram separately illustrating the current $I_{L1}$ passing through the first output inductor L1 and the voltage $V_{C1}$ across the first capacitor C1 in FIG. 1, when the current $I_{L1}$ is discontinuous and the third resistor R3 is 2 kΩ. As shown in FIG. 5, $t_{0,IL1}$ is the time point when the current $I_{L1}$ passing through the first output inductor L1 becomes zero, and $t_{0,VC1}$ is the time point when the voltage $V_{C1}$ across the first capacitor C1 becomes zero. The time difference between $t_{0,IL1}$ and $t_{0,VC1}$ can be used to fine tune the operation of the multiphase DC-to-DC converter 100, for example, to fine tune the timing of turning off the first and second low side switch Q2, Q4. While the resistance of the third resistor R3 becomes larger, the time difference between $t_{0,IL1}$ and $t_{0,VC1}$ will accordingly becomes longer, and vise versa. In addition, the resistance of the third resistor R3 is smaller than or equal to the resistance of the first resistor R1 and the resistance of the second resistor R2, so as to prevent the voltage $V_{C1}$ across the first capacitor C1 being far from the current $I_{L1}$ passing through the first output inductor L1. If the third resistor R3 is 0Ω, then the time points $t_{0,IL1}$ and $t_{0,VC1}$ would be the same and the voltage $V_{C1}$ would be specifically direct proportion to the current $I_{L1}$, as shown in FIG. 6.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A multiphase DC-to-DC converter, comprising:
   a pulse width modulation (PWM) module for generating a plurality of sets of control pulses;
   a current feedback module; and
   at least one DC-to-DC converting module, comprising;
   a first output inductor;
   a second output inductor;
   a first switch element, coupled to the first output inductor, wherein the first switch element receives a set of the control pulses to control a current passing through the first output inductor;
   a second switch element, coupled to the second output inductor, wherein the second switch element receives another set of the control pulses to control a current passing through the second output inductor; and
   a current detector, coupled in parallel to the first output inductor and the second output inductor, for detecting the current passing through the first output inductor and the current passing through the second output inductor,
   wherein the current feedback module adjusts duty cycles of each set of the control pulses in real time according to the currents detected by the current detector, and the current detector comprises a first resistor, a second resistor, a first capacitor, a second capacitor, and a third resistor, wherein the first resistor is coupled in series to the first capacitor, the second resistor is coupled in series to the second capacitor, the third resistor is directly or indirectly coupled between the first capacitor and a load circuit, and the third resistor is directly or indirectly coupled between the second capacitor and the load circuit, such that when the first capacitor is charged, a portion of a charging current for charging the first capacitor passes through the second capacitor, and when the second capacitor is charged, a portion of a charging current for charging the second capacitor passes through the first capacitor,
   wherein a resistance of the third resistor is smaller than or equal to a resistance of the first resistor, and the resistance of the third resistor is smaller than or equal to a resistance of the second resistor.

2. The multiphase DC-to-DC converter as claimed in claim 1, wherein a first end of the first resistor, a first end of the first output inductor and the first switch element are coupled; a second end of the first resistor is coupled to a first end of the first capacitor; a second end of the first capacitor is coupled to a first end of the third resistor; and a second end of the third resistor, a second end of the first output inductor, a second end of the second output inductor and the load circuit are coupled.

3. The multiphase DC-to-DC converter as claimed in claim 1, wherein a first end of the second resistor, a first end of the second output inductor and the second switch element are coupled; a second end of the second resistor is coupled to a first end of the second capacitor; a second end of the second capacitor is coupled to a first end of the third resistor; and a second end of the third resistor, a second end of the first output inductor, a second end of the second output inductor and the load circuit are coupled.

4. The multiphase DC-to-DC converter as claimed in claim 1, wherein the set of control pulses controlling the first switch element and the set of control pulses controlling the second switch element are in anti-phase.

5. The multiphase DC-to-DC converter as claimed in claim 1, wherein, when the first capacitor is charged, the second capacitor is discharged, and when the second capacitor is charged, the first capacitor is discharged.

6. The multiphase DC-to-DC converter as claimed in claim 1, wherein the first switch element comprises a first high side switch, and the second switch element comprises a second high side switch.

7. The multiphase DC-to-DC converter as claimed in claim 6, wherein the first switch element further comprises a first low side switch coupled to the first high side switch, and the second switch element further comprises a second low side switch coupled to the second high side switch.

8. The multiphase DC-to-DC converter as claimed in claim 1, further comprising:
a voltage feedback module; and
a voltage dividing module, for dividing an output voltage which is provided from the DC-to-DC converter to the load circuit, wherein the voltage dividing module comprises a first voltage dividing resistor and a second voltage dividing resistor, the first voltage dividing resistor and the second voltage dividing resistor are coupled in series, and the voltage feedback module adjusts the duty cycles of each set of control pulses according to the voltage across the second voltage dividing resistor.

9. A multiphase DC-to-DC converter, comprising:
a pulse width modulation (PWM) module for generating a plurality of sets of control pulses;
a current feedback module; and
at least one DC-to-DC converting module, comprising:
a first output inductor;
a second output inductor;
a first switch element, coupled to the first output inductor, wherein the first switch element receives a set of the control pulses to control a current passing through the first output inductor;
a second switch element, coupled to the second output inductor, wherein the second switch element receives another set of the control pulses to control a current passing through the second output inductor; and
a current detector, coupled in parallel to the first output inductor and the second output inductor, for detecting the current passing through the first output inductor and the current passing through the second output inductor,
wherein the current feedback module adjusts duty cycles of each set of the control pulses in real time according to the currents detected by the current detector, and the current detector comprises a first resistor, a second resistor, a first capacitor, a second capacitor, and a third resistor, wherein the first resistor is coupled in series to the first capacitor, the second resistor is coupled in series to the second capacitor, the third resistor is directly or indirectly coupled between the first capacitor and a load circuit, and the third resistor is directly or indirectly coupled between the second capacitor and the load circuit, such that when the first capacitor is charged, a portion of a charging current for charging the first capacitor passes through the second capacitor, and when the second capacitor is charged, a portion of a charging current for charging the second capacitor passes through the first capacitor,
wherein a resistance of the third resistor is configured to adjust a time difference between a time point that one of the currents passing through the first and second output inductors is detected as becoming zero by the current detector and a time point that the corresponding current passing through the first or second output inductor exactly becomes zero.

10. The multiphase DC-to-DC converter as claimed in claim 9, wherein a first end of the first resistor, a first end of the first output inductor and the first switch element are coupled; a second end of the first resistor is coupled to a first end of the first capacitor; a second end of the first capacitor is coupled to a first end of the third resistor; and a second end of the third resistor, a second end of the first output inductor, a second end of the second output inductor and the load circuit are coupled.

11. The multiphase DC-to-DC converter as claimed in claim 9, wherein a first end of the second resistor, a first end of the second output inductor and the second switch element are coupled; a second end of the second resistor is coupled to a first end of the second capacitor; a second end of the second capacitor is coupled to a first end of the third resistor; and a second end of the third resistor, a second end of the first output inductor, a second end of the second output inductor and the load circuit are coupled.

12. The multiphase DC-to-DC converter as claimed in claim 9, wherein the set of control pulses controlling the first switch element and the set of control pulses controlling the second switch element are in anti-phase.

13. The multiphase DC-to-DC converter as claimed in claim 9, wherein, when the first capacitor is charged, the second capacitor is discharged, and when the second capacitor is charged, the first capacitor is discharged.

14. The multiphase DC-to-DC converter as claimed in claim 9, wherein the first switch element comprises a first high side switch, and the second switch element comprises a second high side switch.

15. The multiphase DC-to-DC converter as claimed in claim 14, wherein the first switch element further comprises a first low side switch coupled to the first high side switch, and the second switch element further comprises a second low side switch coupled to the second high side switch.

16. The multiphase DC-to-DC converter as claimed in claim 9, further comprising:
a voltage feedback module: and
a voltage dividing module, for dividing an output voltage which is provided from the DC-to-DC converter to the load circuit, wherein the voltage dividing module comprises a first voltage dividing resistor and a second voltage dividing resistor, the first voltage dividing resistor and the second voltage dividing resistor are coupled in series, and the voltage feedback module adjusts the duty cycles of each set of control pulses according to the voltage across the second voltage dividing resistor.

* * * * *